(12) United States Patent
Cheng

(10) Patent No.: US 8,208,976 B2
(45) Date of Patent: Jun. 26, 2012

(54) PORTABLE ELECTRONIC DEVICE

(75) Inventor: Chao-Yuan Cheng, Tu-Cheng (TW)

(73) Assignee: FIH (Hong Kong) Limited, Kowloon (HK)

( * ) Notice: Subject to any disclaimer, the term of this patent is extended or adjusted under 35 U.S.C. 154(b) by 482 days.

(21) Appl. No.: 12/478,026

(22) Filed: Jun. 4, 2009

(65) Prior Publication Data

US 2010/0124951 A1 May 20, 2010

(30) Foreign Application Priority Data

Nov. 17, 2008 (CN) .......................... 2008 1 0305594

(51) Int. Cl.
H04M 1/00 (2006.01)
(52) U.S. Cl. ............... 455/575.1; 455/575.3; 455/575.4; 455/90.3; 455/550.1; 455/128
(58) Field of Classification Search ............... 455/575.1, 455/345, 341, 575.2, 575.3, 575.4, 550.1
See application file for complete search history.

(56) References Cited

U.S. PATENT DOCUMENTS

| 7,206,617 | B2 * | 4/2007 | Hutchison et al. | ......... 455/575.3 |
| 7,394,038 | B2 * | 7/2008 | Chang | ........................... 200/341 |
| 7,579,561 | B2 * | 8/2009 | Wee et al. | .................. 200/5 A |
| 2007/0010219 | A1 * | 1/2007 | Qin et al. | .................... 455/128 |

FOREIGN PATENT DOCUMENTS

JP 2002175155 * 6/2002

* cited by examiner

Primary Examiner — Edward Urban
Assistant Examiner — Ganiyu Hanidu
(74) Attorney, Agent, or Firm — Altis Law Group, Inc.

(57) ABSTRACT

A portable electronic device includes a cover member, a keypad and a decorative member. The cover member defines a keypad mounting cavity. The keypad includes an annular protrusion protruding from a periphery thereof. The keypad is mounted in the keypad mounting cavity of the cover member. The decorative member includes a resisting board protruding from a peripheral wall thereof. The decorative member is sandwiched between the cover member and the keypad, with the resisting board resisting an interior surface of the cover member and the annular protrusion abutting against the resisting board, thus preventing impurities from entering into the portable electronic device via the keypad.

2 Claims, 5 Drawing Sheets

PORTABLE ELECTRONIC DEVICE

BACKGROUND

1. Technical Field

The present invention relates to portable electronic devices and, particularly, to a portable electronic device incorporating a detachable keypad assembly.

2. Description of Related Art

With the ongoing development of technology, portable electronic devices (e.g., mobile phones or personal digital assistants, PDAs) have become widely used.

A typical portable electronic device includes a body member and a keypad assembly mounted to the body member. The keypad assembly is usually required to match the body member in color and pattern, to achieve an attractive appearance.

However, the decorative effect of the portable electronic device remains unchanged and users cannot change the color or the pattern of the keypad assembly according to his/her interest. Furthermore, impurities e.g., water and dust may enter into the portable electronic device via the keypad assembly.

Therefore, there is room for improvement within the art.

BRIEF DESCRIPTION OF THE DRAWINGS

Many aspects of a portable electronic device can be better understood with reference to the following drawings. These drawings are not necessarily drawn to scale, the emphasis instead being placed upon clearly illustrating the principles of the present portable electronic device. Moreover, in the drawings like reference numerals designate corresponding sections throughout the several views.

DETAILED DESCRIPTION

Figure 1:
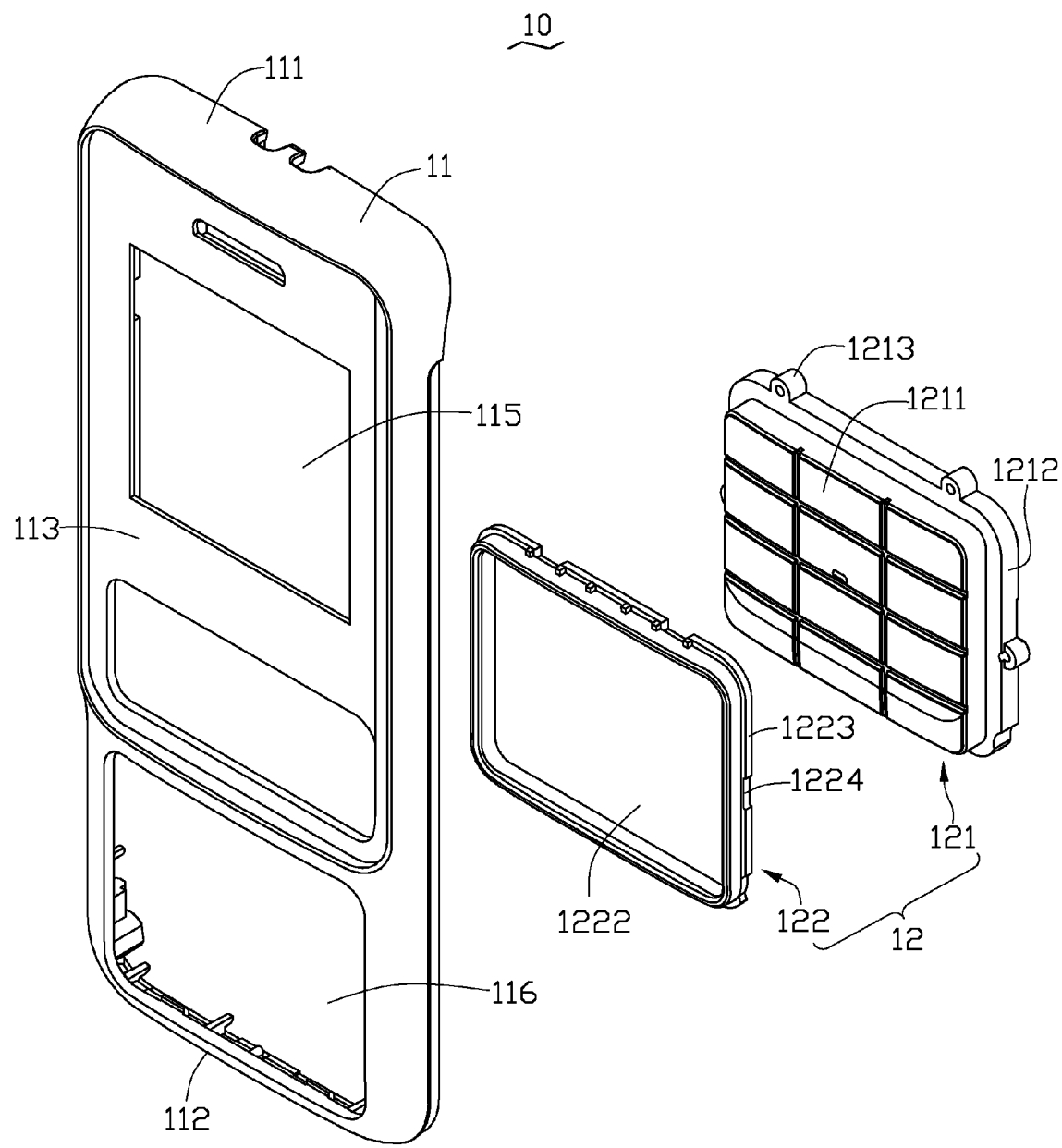
FIG. 1 is an exploded, isometric view of a portable electronic device, according to an exemplary embodiment.
Figure 2:
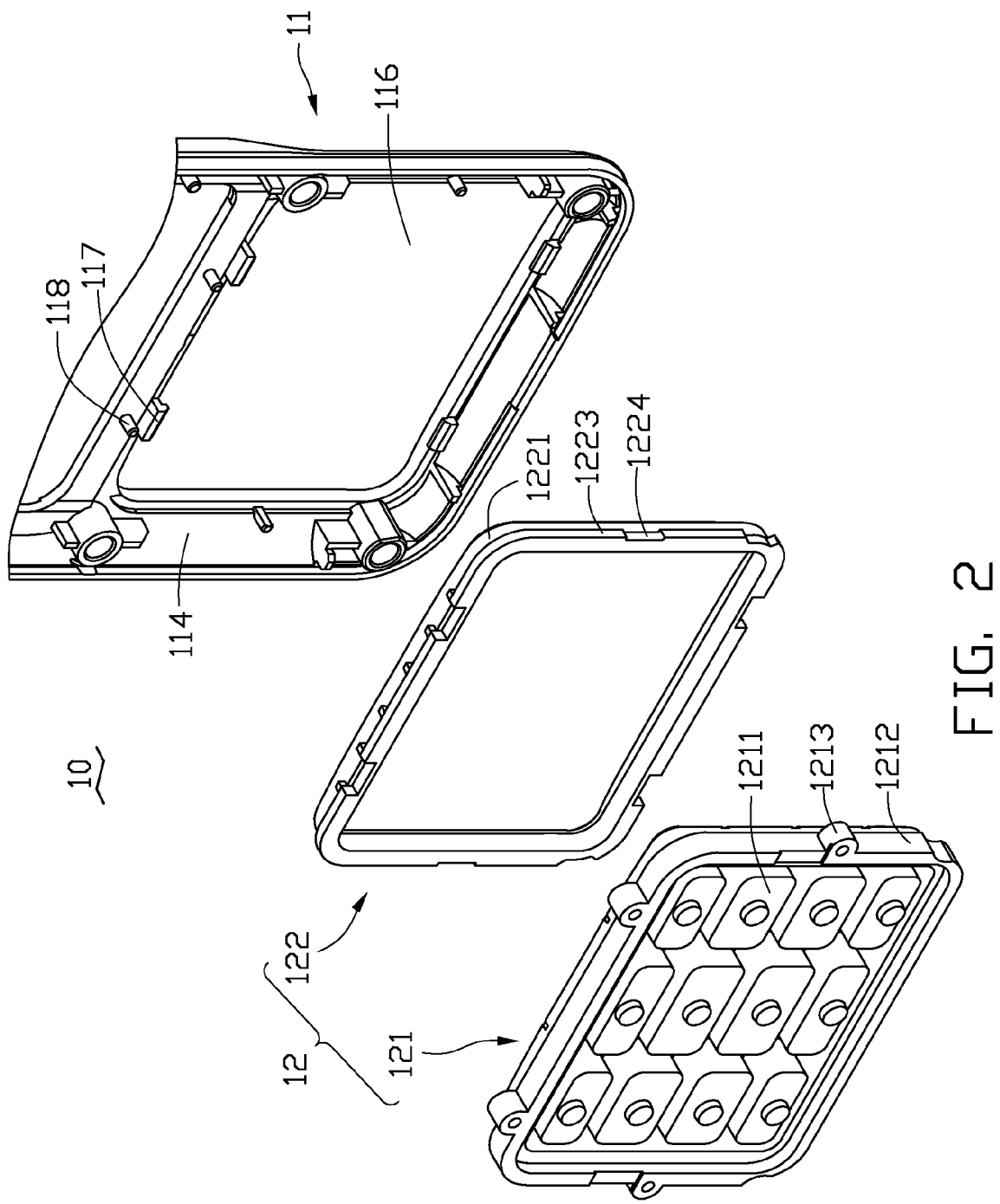
FIG. 2 is another exploded, isometric view of the portable electronic device shown in FIG. 1.
Figure 3:
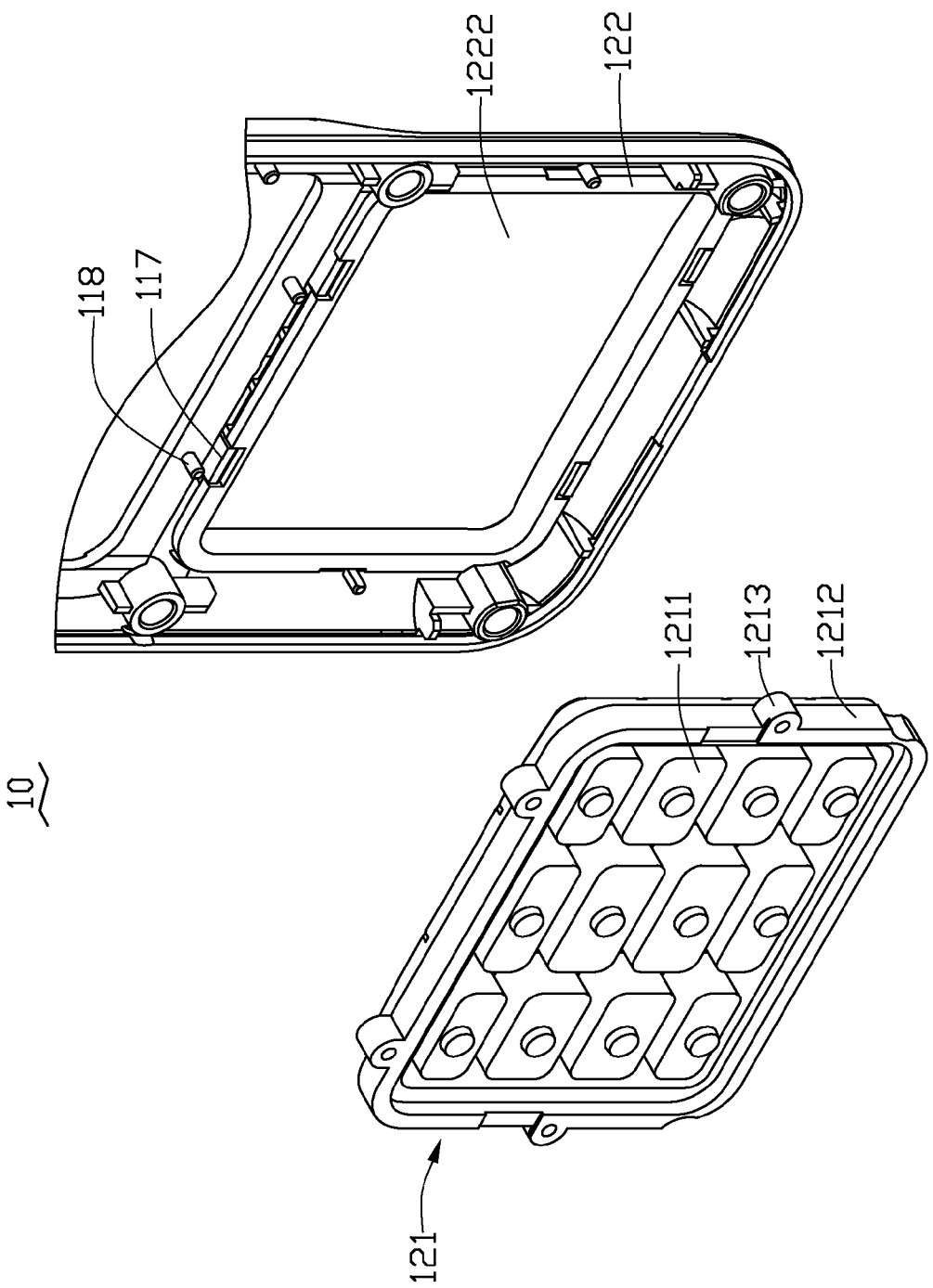
FIG. 3 is a partially assembled view of the portable electronic device shown in FIG. 1.
Figure 4:
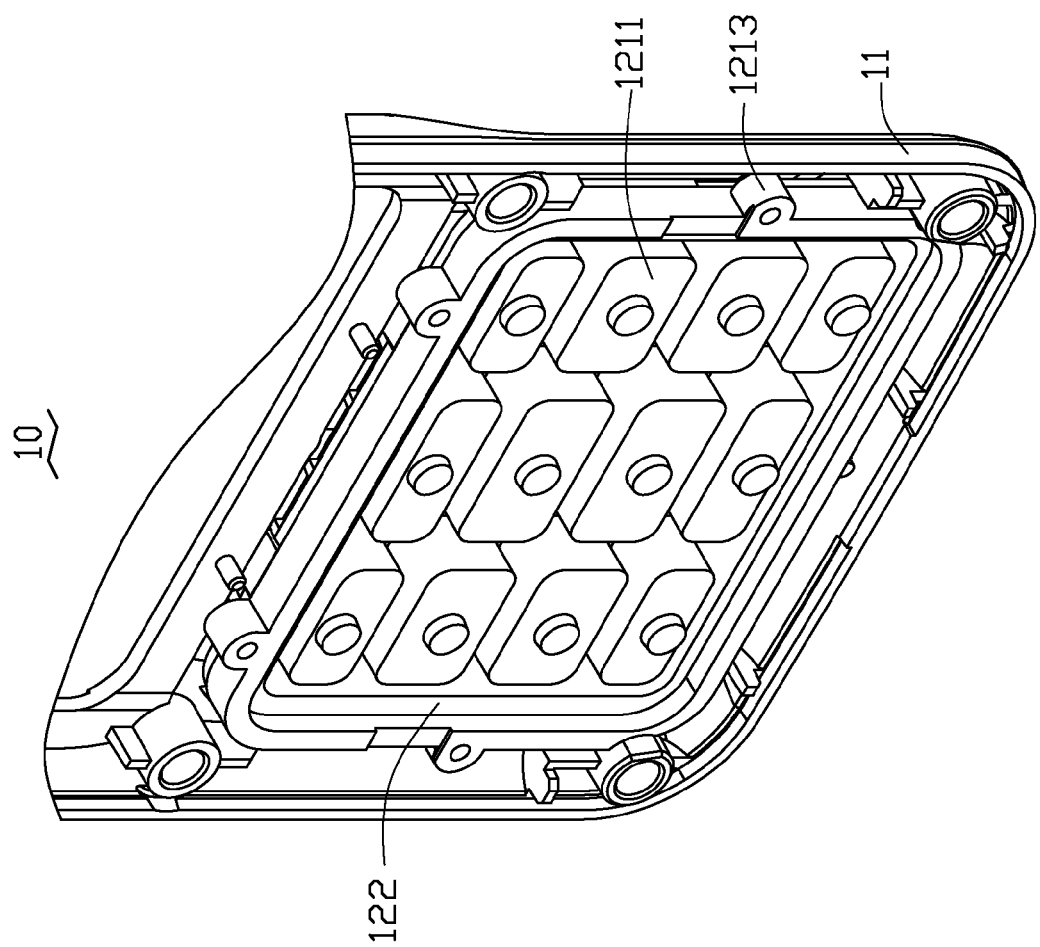
FIG. 4 is an assembled view of the portable electronic device shown in FIG. 1.
Figure 5:
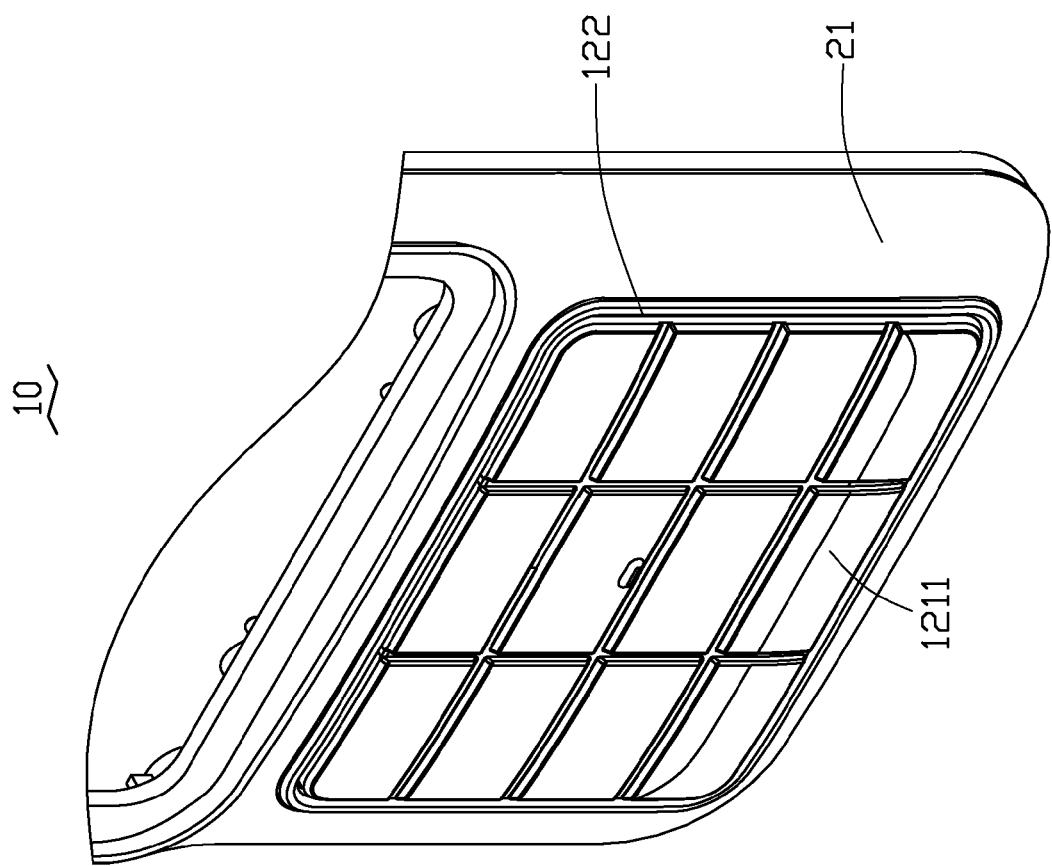
FIG. 5 is another assembled view of the portable electronic device shown in FIG. 1.

FIGS. 1 and 2 show an exemplary portable electronic device 10. The portable electronic device 10 includes a cover member 11, a keypad 121 and a decorative member 122. The decorative member 122 is sandwiched between the keypad 121 and the cover member 11.

The cover member 11 includes a top wall 111, a bottom wall 112, an exterior surface 113 and an interior surface 114. The cover member 11 defines a display mounting cavity 115 and a keypad mounting cavity 116. The display mounting cavity 115 is adjacent to the top wall 111. The keypad mounting cavity 116 is adjacent to the bottom wall 112. A plurality of limiting blocks 117 and latching poles 118 protrude form the interior surface 114 adjacent to the keypad mounting cavity 116.

The keypad 121 is configured to be received in the keypad mounting cavity 116 of the cover member 11. The keypad 121 includes a plurality of buttons 1211. The keypad 121 includes an annular protrusion 1212 protruding from a peripheral wall of the keypad 121. A plurality of hollow fastening columns 1213 are defined on a periphery of the annular protrusion 1212. The fastening columns 1213 are aligned with and engaged with the latching poles 118.

The decorative member 122 is a frame. The decorative member 122 is made of elastic material. Thus, the decorative member 122 can generate a substantial elastic deformation under pressure. In this embodiment, the decorative member 122 is made of rubber. The decorative member 122 includes a peripheral wall 1221 and a through hole 1222 enclosed by the peripheral wall 1221. A resisting board 1223 protrudes from one side of the peripheral wall 1221. The resisting board 1223 has a plurality of limiting cutouts 1224 defined on a peripheral edge corresponding to the limiting blocks 117.

In assembly, the decorative member 122 is received in the keypad mounting cavity 116 from the interior surface 114 of the cover member 11. The peripheral wall 1221 is tightly attached to the inner wall of the keypad mounting cavity 116. The resisting board 1223 abuts against the interior surface 114 of the cover member 11. The limiting blocks 117 are inserted into the limiting cutouts 1224. Then the keypad 121 is inserted into the through hole 1222 of the decorative member 12 from the interior surface 114 of the cover member 11. The buttons 1211 are exposed from the exterior surface 113 of the cover member 11 through the through hole 1222. The annular protrusion 1212 tightly abuts against the resisting board 1223. The latching poles 118 are aligned and engaged with the fastening columns 1213. Therefore, the decorative member 122 is deformed and tightly sandwiched between the interior surface 114 and the keypad 121, thus efficiently preventing water or dust from entering into the portable electronic device 10 via the keypad 121. Furthermore, the decorative member 122 can be printed into different colors and patterns, thus an user can detach the keypad assembly 10 and change for another decorative member 122 with different colors and patterns according to his/her interest.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of sections within the principles of the invention to the full extent indicated by the broad general meaning of the terms, in which the appended claims are expressed.

What is claimed is:

1. A portable electronic device, comprising:
   a cover member including an exterior surface and an interior surface, the cover member defining a keypad mounting cavity, a plurality of limiting blocks and latching poles protruding from the interior surface around the keypad mounting cavity;
   a keypad including a plurality of buttons and an annular protrusion protruding from a periphery of the buttons, the buttons being mounted in the keypad mounting cavity, a plurality of fastening columns formed on the annular protrusion; and
   a decorative member being a frame including a peripheral wall and a resisting board protruding from the peripheral wall, the resisting board defining a plurality of limiting cutouts, the decorative member being firstly received in the keypad mounting cavity from the interior surface, the peripheral wall of the decorative member received the keypad mounting cavity, and the resisting board abutting against the interior surface of the cover member, the limiting blocks inserted into the limiting cutouts; the keypad received in the frame, the buttons exposed from the exterior surface of the cover member; the annular protrusion abutting against the resisting board, the latching poles aligned and engaged with the fastening columns to allow the decorative member to be sandwiched between the cover member and the keypad, thus preventing impurities from entering into the portable electronic device via the keypad.

2. The portable electronic device as claimed in claim 1, wherein the decorative member is made of rubber.

* * * * *